United States Patent
Morgan et al.

(10) Patent No.: US 9,176,316 B2
(45) Date of Patent: Nov. 3, 2015

(54) SPATIAL LIGHT MODULATION DISPLAY SYSTEM

(71) Applicant: TEXAS INSTRUMENTS INCORPORATED, Dallas, TX (US)

(72) Inventors: Daniel J. Morgan, Denton, TX (US); Roger S. Carver, McKinney, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/866,671

(22) Filed: Apr. 19, 2013

(65) Prior Publication Data

US 2013/0257894 A1  Oct. 3, 2013

Related U.S. Application Data

(62) Division of application No. 11/092,419, filed on Mar. 29, 2005, now abandoned.

(51) Int. Cl.
| | |
|---|---|
| *G09G 3/34* | (2006.01) |
| *G02B 26/00* | (2006.01) |
| *G09G 5/02* | (2006.01) |
| *G02B 26/08* | (2006.01) |

(52) U.S. Cl.
CPC .............. *G02B 26/007* (2013.01); *G09G 3/346* (2013.01); *G09G 5/02* (2013.01); *G02B 26/0816* (2013.01); *G09G 2320/0242* (2013.01); *G09G 2320/0666* (2013.01); *G09G 2320/0693* (2013.01); *G09G 2360/141* (2013.01)

(58) Field of Classification Search
CPC ................ G09G 3/346; G09G 3/3413; G09G 2320/0242; G09G 2320/0693; G09G 2320/0666; G09G 2360/141; G02B 26/007; G02B 26/0816

USPC ..................... 345/84–86, 108–111, 207, 690; 359/196, 197, 201, 212, 213, 224, 226, 359/242, 243; 348/750, 755, 758, 759, 770, 348/771, 795

See application file for complete search history.

(56) References Cited

U.S. PATENT DOCUMENTS

| | | | |
|---|---|---|---|
| 5,061,049 A | 10/1991 | Hornbeck | |
| 5,280,277 A | 1/1994 | Hornbeck | |
| 5,774,196 A | 6/1998 | Marshall | |
| 6,464,633 B1 * | 10/2002 | Hosoda et al. | ................ 600/178 |
| 6,587,159 B1 | 7/2003 | Dewald | |
| 6,590,554 B1 * | 7/2003 | Takayama | ........................ 345/92 |
| 6,594,387 B1 | 7/2003 | Pettitt et al. | |
| 6,633,301 B1 * | 10/2003 | Dallas et al. | .................. 345/597 |
| 7,165,845 B2 | 1/2007 | Takeda et al. | |

* cited by examiner

*Primary Examiner* — Jimmy H Nguyen

(74) *Attorney, Agent, or Firm* — Jacqueline J. Garner; Frank D. Cimino

(57) ABSTRACT

An improved spatial light modulation display system includes light sources for providing red, green, and blue light. A system controller includes functionality for controlling a color balance of the red, green, and blue light. A sensor is provided for sensing light from each of the light sources. The controller can detect a shift in color balance based on the intensity of light sensed by the sensor. If the sensor output indicates that the sensor is operating out of a desirable range, the spatial light modulator can modulate the light in order change the brightness of light sensed by the sensor. The modulation pattern can be varied until the sensor output is a specified value or within a specified range of values. In a preferred embodiment, the sensor is located to receive off-state light from the spatial light modulator so as to avoid obstruction of light used for displaying images.

16 Claims, 5 Drawing Sheets

SPATIAL LIGHT MODULATION DISPLAY SYSTEM

CROSS-REFERENCE TO RELATED APPLICATIONS

This application is related to U.S. patent application Ser. No. 10/951,995, entitled "Spatial Light Modulation Display System," filed on Sep. 27, 2004, which is incorporated herein by reference.

TECHNICAL FIELD

The present invention relates generally to display systems that use a spatial light modulation device.

BACKGROUND

Spatial light modulation (SLM) display systems are display systems that use light reflected or transmitted by individual elements of a spatial light modulator to generate a display image. One type of spatial light modulator is a digital micromirror device (DMD). SLM display systems are known that incorporate a DMD, such as those commercially available from Texas Instruments, Inc. under the trademark DLP™ (Digital Light Processing).

FIG. 1 shows an example of an SLM projection display system 10. The system 10 includes an arc lamp 11 that emits white light. A first condenser lens 13 focuses the white light onto a color filter wheel 15. A second condenser lens 17 receives the filtered light and focuses it onto a DMD chip 19. The DMD chip 19 includes an array of tiny mirror elements, which together modulate the light and transmit the modulated light to projection lens 29, where it can be focused for display on the screen 31.

FIG. 2 shows a portion of a DMD array 19 having mirror elements 21 suspended over a substrate 23. Electrostatic attraction between the mirror 21 and an address electrode 25 causes the mirror 21 to twist or pivot, in either of two directions, about an axis formed by a pair of torsion beam hinges 27a and 27b. Typically, the mirror 21 rotates about these hinges until the rotation is mechanically stopped. The movable mirror 21 tilts into the on or off states by electrostatic forces depending on the data written to an associated memory cell (not shown). The tilt of the mirror 21 can be on the order of plus 10 degrees (on) or minus 10 degrees (off) to modulate the light that is incident on the mirrored surface. For additional details, see U.S. Pat. No. 5,061,049 entitled "Spatial Light Modulator" and U.S. Pat. No. 5,280,277 entitled "Field Updated Deformable Mirror Device," both to Larry J. Hornbeck.

Referring again to FIG. 1, the color filter wheel 15 includes red (R), green (G), and blue (B) filter elements. The filter wheel 15 is driven by a motor 16 to rotate so that the different color filter elements sequentially filter the light passing through the filter wheel 15. Thus, as the filter wheel 15 rotates, the color of light emanating from the filter wheel 15 changes according to the wheel position. Typically the filter wheel 15 rotates at least once per frame for display of a multi-color image. The frequency of the rotation of the wheel 15 is controlled by a sequencer 33 based on the frame rate of image data received from an image source 35.

SUMMARY

Disclosed herein is an improved SLM display system that uses light emitting diodes (LEDs) for red, green, and blue light sources. Thus, red, green and blue light can be emitted from the light source, eliminating the need for a color wheel assembly as used in prior systems.

Like with other types of light sources, LEDs lose brightness as their operational time increases. However, as LEDs age, each of the R, G, and B LEDs may lose brightness at different rates. This will cause the white point (color balance) to shift as the operational time of the LED display system increases. Thus, a method is needed to detect this white point shift and then adjust the brightness of R, G, and B colors so that the white point is restored to the desired value.

Even new display systems coming out of production with new LEDs can have variations in white point due to variations in the brightness of light emitted from the LEDs. Therefore, a method is needed for adjusting the white point to an acceptable value when these display systems are turned on. Preferably, this can be done without having to manually adjust (through hardware or firmware) any parts in the display system.

Accordingly, disclosed herein is a method and apparatus for detecting and adjusting the white point (color balance) in an SLM display system. As disclosed herein, a sensor is used to detect the color intensity of each of the R, G, and B LEDs. This information can then be used to adjust the intensity of light emitted by the LEDs to move the white point back to a prescribed value.

The sensor can be positioned to sense light directed in an off-state light direction by the DMD as described in greater detail below. Then, as a display system is powered-up (or every N power-ups), the DMD can be turned off for one color and on for the other two. This will allow just one color LED light to strike the sensor. For example, if the DMD mirrors are turned on during the time intervals for R and G LED light and off during the time interval for B LED light, then the display screen will show yellow and the sensor will see only blue light. The intensity of the blue light can then be measured independently of the red and green lights. This process can then be repeated to sense the R and G light independently, and data can be collected for the intensity of each of the R, G, and B lights. Alternatively, the light sensor can be placed at any point along a path between the LEDs and a display screen where the display system displays images, including positions where the sensor collects light at the boundaries of the light path so as to avoid interfering with light going to the screen.

During this process, the sensor sees full-scale light for each color, which may be too bright for the sensor to accurately measure given LED and optical variations that can exist. To correct for this problem, the DMD can be used to modulate the light that the sensor detects. So, for example, if the system controller receives a signal from the sensor and determines that the sensor is at or near full-scale (or otherwise outside an optimal operating range of the sensor) during the blue-light reading, then the system controller can command that a calibration image (modulation pattern) be applied that reduces the intensity of blue light striking the sensor. In some embodiments, a calibration image can be applied by default rather than allowing full-scale brightness of the LED light by default. The patterns for the calibration image can be blue-noise patterns where the density of the pattern determines the color intensity that the sensor sees. The pixels in the pattern can be either always on or always off throughout the blue light time (or red or green light time if the light of either of those colors is too bright).

The sensor can be positioned such that the light reflected from the DMD mirrors in their off-state is not focused directly on the sensor. This way, the light from the blue noise patterns will appear as a single intensity over the entire sensitive area of the sensor. In other words, the sensor will not see individual pixels, so the pixel-to-pixel modulation will have no impact on the sensor other than reducing the average brightness level according to the density of the blue-noise pattern.

Different blue-noise patterns (e.g., densities) can be tried by the control system until the sensor is in a desirable operating range for determining the light intensities. The controller can read and store sensor data as well as record the density of the blue-noise pattern used for the intensity of light associated with the sensor data. These two parameters can then be used to determine the total relative intensity of light from the R, G, and B LEDs.

Each display color intensity is adjusted until a prescribed color balance is restored. For example, it is often desirable that the ratio of lumens intensity that the display screen sees be set to 0.2R/0.7G/0.1B. This means that it is not always simply a matter of achieving the same lumens for each color LED for proper white balance. Depending on which color standard is used, the exact ratio of colors can vary.

In some embodiments, the density of the blue-noise patterns can be varied so that the sensor is driven to output a same brightness signal (e.g., same voltage level) for each color. In other embodiments, the density of the blue-noise patterns can be varied just enough to where the sensor is operating within an acceptable operating range, and the relative intensities of the LEDs can be derived from the brightness signals from the sensor along with the density of the blue-noise patterns used.

Also, in some embodiments, patterns other than blue-noise patterns can be used for modulating the off-state light. For example, other patterns can include white-noise patterns or structured patterns. An example of a structured pattern can be a checkerboard pattern for 50% density.

In some embodiments, the relative intensities of light from the LEDs can be adjusted by increasing or decreasing electrical current to the LEDs. Alternatively, the LED currents can be left the same and the relative intensity of the appropriate colors can be turned down electronically via signal processing. For example, the P7, or "7 Primary" algorithm disclosed in U.S. Pat. No. 6,594,387 to Greg Pettitt, the contents of which are hereby incorporated by reference, can be used to turn down the colors needed by adjusting the electronic gain on the appropriate color channels. A benefit of using the P7 algorithm is that P7 gains the appropriate colors down for color points near white, but as the colors approach saturation the gain is returned to its normal setting. The result is, that unlike reduced actual drive current to the LED, the LEDs can all remain at their full brightness for saturated colors and near-saturated colors. Thus, colors near or at R, G, B, Y, C, and M remain at the maximum brightness possible. While this can result in some distortion in the relative intensity of some color shades, many viewers of images prefer the brighter colors.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
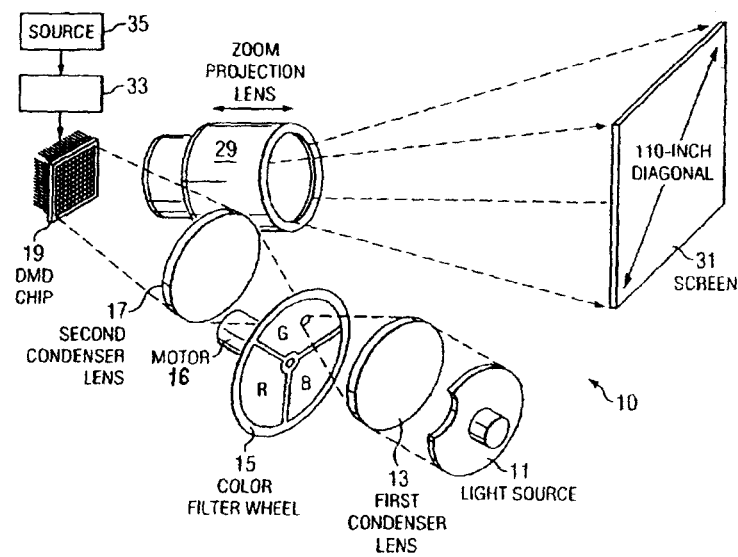
FIG. 1 shows a block diagram of a conventional DMD-based display system.
Figure 2:
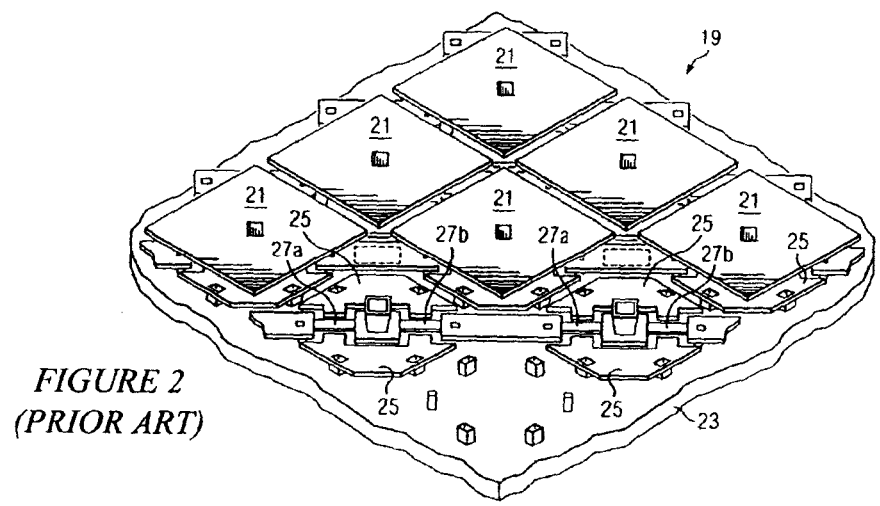
FIG. 2 shows a perspective view of an array of DMD mirrors.
Figure 3:
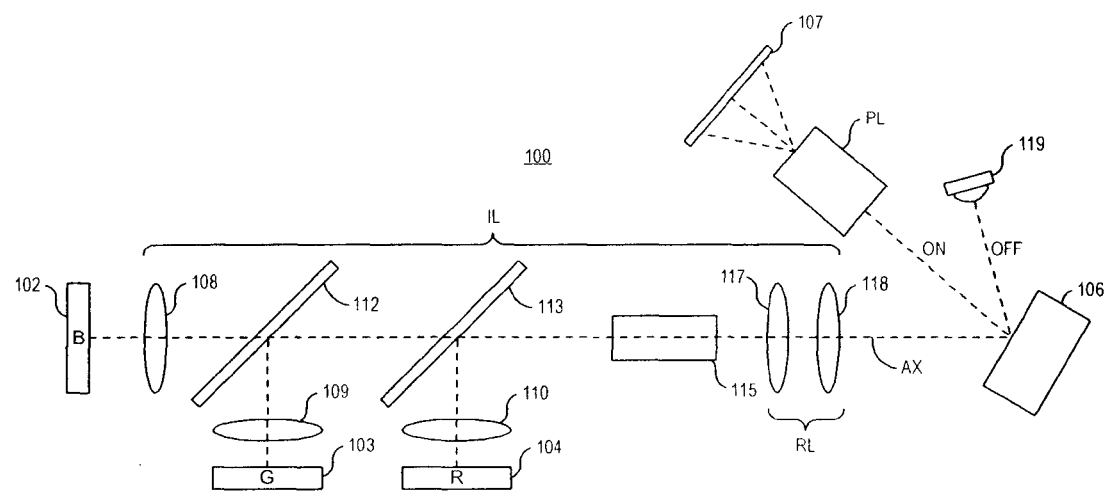
FIG. 3 shows an embodiment of a spatial light modulation (SLM) display system.

FIG. 3 shows an optical construction for a spatial light modulation (SLM) display system 100. The display system 100 includes a first light source 102, a second light source 103, and a third light source 104. The display system 100 also includes, along an optical axis AX, an illumination optical system IL, a DMD 106, and a projection optical system PL for projecting an image onto a projection surface 107. The light sources 102-104 and the DMD 106 operate according to instructions received from a system controller 120 (shown in FIGS. 4 and 5).

The light sources 102-104 each can include a single light emitting diode (LED) or an array of LEDs for emitting a respective one of three primary colors. In the present embodiment, the first light source 102 includes an LED array for emitting blue light, the second light source 103 includes an LED array for emitting green light, and the third light source 104 includes an LED array for emitting red light. However, other colors and arrangements of colors can be used.

The light radiated from the light sources 102-104 is directed through the illumination optical system IL to the DMD 106. The illumination optical system IL comprises a plurality of optical elements for directing and smoothing the light from the light sources 102-104.

The illumination optical system IL includes collimating lenses 108-110 for collimating light from the light sources 102-104. Specifically, the blue light from the first light source 102 is collimated by a collimating lens 108, the green light from the second light source 103 is collimated by a collimating lens 109, and the red light from the third light source 104 is collimated by a collimating lens 110.

The illumination optical system IL also includes a pair of filter elements 112 and 113. The first filter element 112 passes the blue light and reflects the green light. The second filter element 113 passes the blue and green light and reflects the red light. In some embodiments, the filter elements 112 and 113 can be optical elements having a dichroic surface for filtering.

As mentioned above, the illumination optical system IL performs a function of smoothing the light from the light sources 102-104. Smoothing the light makes it possible to minimize the difference in brightness between axial and off-axial rays on the display surface of the DMD 106 (i.e., it is possible to make the brightness distribution uniform). This smoothing of illumination light is achieved by an integrator rod 115.

The illumination optical system IL further includes a relay lens unit RL for relaying light from the integrator rod 115 to the DMD 106. In the present embodiment, the relay lens unit RL includes a first relay lens 117 and a second relay lens 118. However, those skilled in the art will appreciate that other configurations and combinations of optical elements can be used as needed for the relay lens unit RL.

The DMD 106 includes an array of independently controllable mirror elements, which together modulate the light received from the illumination optical system IL and transmit the modulated light to the projection optical system PL, where it can be focused for display on the projection surface 107, such as a screen. More specifically, the DMD 106 is so constructed that each of its mirror elements is in one of two differently inclined states, namely either in an ON state or in an OFF state. Only mirror elements in their ON state direct the illumination light along the optical axis ON shown in FIG. 3, towards the projection optical system PL for display. The mirror elements in their OFF state direct the illumination light along the optical axis OFF shown in FIG. 3, in a non-display direction away from the projection optical system.

The light directed along the optical axis ON in the display direction passes through the projection optical system PL and eventually forms a display image on the projection surface 107. The projection optical system PL can include any number of optical elements for projecting the image light modulated by the DMD 106 onto the projection surface 107 located at a predetermined distance or within a predetermined range of distances.

The light directed along the optical axis OFF in the non-display direction is sensed by a light sensor 119. The light sensor 119 is preferably located for sensing an intensity of light directed from the DMD 106 in the non-display direction. However, other locations for the light sensor 119 can be used. The light sensor 119 outputs a brightness signal indicative of the intensity of received light. In some embodiments, the brightness signal is a voltage having a voltage level indicative of the intensity of received light.

Figure 4:
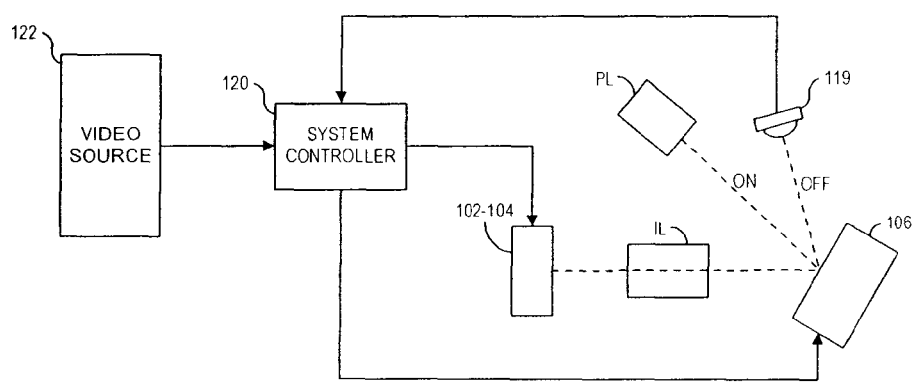
FIG. 4 shows a block diagram of control elements of a display system, such as the one shown in FIG. 3.

The light sensor 119 outputs the brightness signal to a system Controller as shown in FIG. 4, which shows an overview of control elements of the display system 100. The system controller 120 also receives image data from a video source 122. The system controller 120 outputs control signals to the light sources 102-104 and to the DMD 106 according to the image data received from the video source 122. The system controller 120 controls the intensity of the output of the light sources 102-104 according to brightness signals received from the light sensor 119 based on a prescribed color balance or white point.

Figure 5:
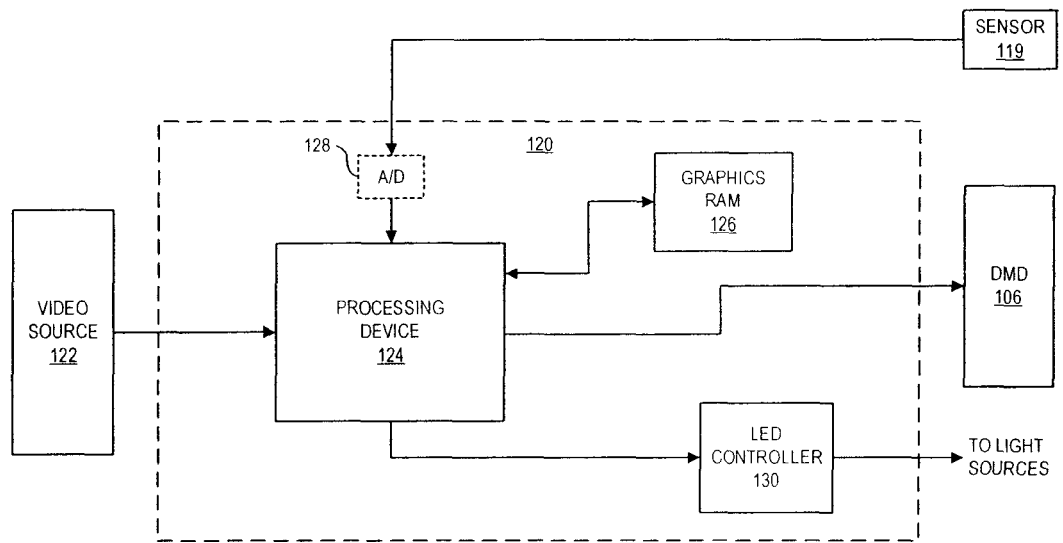
FIG. 5 shows a block diagram of a system controller of a display system, such as the one shown in FIGS. 3 and 4.

FIG. 5 shows a more detailed view of the system controller 120. The system controller 120 includes a processing device 124 that receives image data from the video source 122. The image data can be digital RGB or YUV video or graphics data. The controller can convert YUV data into RGB data as needed for writing data to the DMD. The image data can originate from any of a number of devices, including a computer, a set-top box for cable or satellite television, a television antenna or many other sources.

The processing device 124 can include circuitry for processing the image data to put it in the proper format and/or to otherwise modify characteristics of the image to be displayed. Specific examples of circuitry that can be included in the processing device 124 include gamma circuitry, color hue correction circuitry, blue-noise spatial temporal multiplexing (STM) circuitry, and noise-free boundary dispersion circuitry. If the video source 122 provides analog image data, then the processing device 124 can also include an analog-to-digital converter. The processing device 124 can also include data arrangement circuitry for arranging the pixel data into proper patterns to be displayed by the DMD 106.

The graphics RAM 126 comprises a memory capable of storing one or more complete video frames. The video frames may be stored, for example, in the graphics RAM 126 as a set of bit-planes. For example, where the pixel data has an 8-bit per color format, the data can be stored as 24 bit-planes. Each bit plane corresponds to one bit of an eight bit value representing the intensity of one of the three primary colors of light. Because there are three eight-bit values, 24 bit planes are stored. Alternative forms of storage are readily contemplated and the pixel data can alternatively be stored as groups of bits, rather than as individual bit planes. The graphics RAM 126 can be a dynamic random access memory array, for example a double data rate synchronous random access memory. The graphics RAM 126 can additionally serve as a general purpose processing RAM.

At the appropriate time, the processing device 124 fetches output video pixel data stored in the graphics RAM 126, reformats the pixel data as is appropriate for DMD data, and then transfers the data to the DMD 106 for display. As explained below, the light sources 102-104 are controlled to provide the blue, green, and red light, respectively, to the DMD 106, allowing the DMD 106 to produce a color video image composed of a plurality of colors created by combining the primary colors of light supplied by the light sources 102-104.

The processing device 124 controls the timing of transfers of output video pixel data to the DMD 106, the location in the graphics RAM 126 where the data is transferred from, the position on the DMD 106 where the output pixel data is displayed, and the timing necessary to display the data. The processing device 124 also provides instructional color data to an LED controller 130 for controlling activation of the light sources 102-104 according to colors associated with the output video pixel data. The processing device 124 generates timing information based on the image data received from the video source 122 with a frequency equivalent to the frequency of the video frame that is to be displayed on the DMD 106. The processing device 124 uses this timing information for controlling the transfer of video frames from the graphics memory 126 to the DMD 106. The sequence of timing instructions needed to generate the addresses and timing signals necessary to display an entire frame of video data can be stored in a timing memory (not shown) internal to the processing device 124, or alternatively in a separate external memory such as a Flash memory. The processing device 124 outputs instructional color data for activation of the light sources 102-104 sequentially in time, activating each color for a portion of each frame. For example, the light sources 102-104 can be activated such that the red light source 104 is first activated for 14% of the frame period, then the green light source 103 is activated for 60% of the frame period, and then the blue light source is activated for the remaining 26% of the frame period. It should be noted that this is just one of many possible sequences and percentages that can be used.

The LED controller 130 includes logic for decoding the instructional color data received from the processing device 124. The LED controller 130 provides control signals for activating the light sources 102-104 according to the instructional color data.

The processing device 124 receives brightness data from the sensor 119. In some embodiments, an optional analog-to-digital converter 128 can be used to convert analog brightness signals from the sensor 119 to digital brightness data. The processing device 124 receives the brightness data and performs a process for detecting a shift in color balance as discussed in greater detail below in connection with FIG. 6. In some embodiments, the processing device 124 can then issue instructional data to the LED controller 130 to adjust the current supplied to the light sources 102-104 as necessary to restore proper white balance. Another method of adjusting the power would be to alter the duty cycles to the LEDs while holding the current level to each LED constant. In other embodiments, the processing device can use the P7, or "7

Primary" algorithm discussed above to turn down the colors as needed by adjusting the electronic gain on the appropriate color channels.

The processing device 124 can detect whether the sensor 119 is operating within a specified operating range based on the brightness signal output from the sensor 119. For example, if the light detected by the sensor 119 is too bright, the sensor 119 output is clipped. For other reasons discussed below, it can be desirable for the sensor 119 to output brightness signals having a specific value or having a value that is within a specified range of values. In any case, if the output of the sensor 119 is outside of a desired range, the processing device 124 can control the DMD 106 to modulate the light being directed towards the sensor (along the optical axis OFF in the embodiment shown in FIGS. 3 and 4). It should be noted that, in some embodiments, a calibration image can be applied by default rather than allowing full-scale brightness of the LED light by default. By modulating the light, the brightness of the light can be controlled so as to control the intensity of light striking the sensor. The patterns for the calibration image are preferably blue-noise patterns where the density of the pattern determines the intensity of light directed in the direction of the sensor 119. Alternatively, patterns other than blue-noise patterns can be used for modulating the light. For example, other patterns can include white-noise patterns or structured patterns. An example of a structured pattern can be a checkerboard pattern for 50% density.

The system controller 120 has been illustrated to include four functional blocks. It is understood, however, that the delineation of particular functions is somewhat arbitrary and that each of these functions could be performed in one or more different integrated circuits that operate according to circuit design and/or software control. The functional blocks are labeled here for purposes of illustration and several of the functions can be combined of separated in various circuits or other functional units. The system controller 120 is not limited to use with the display system 100; rather it can be used with a variety of illumination systems, particularly those including or one or more light source(s) and one or more spatial modulation device(s). For example, it is contemplated that a single light source could be used to selectively emit two or more different colors of light.

Figure 6:
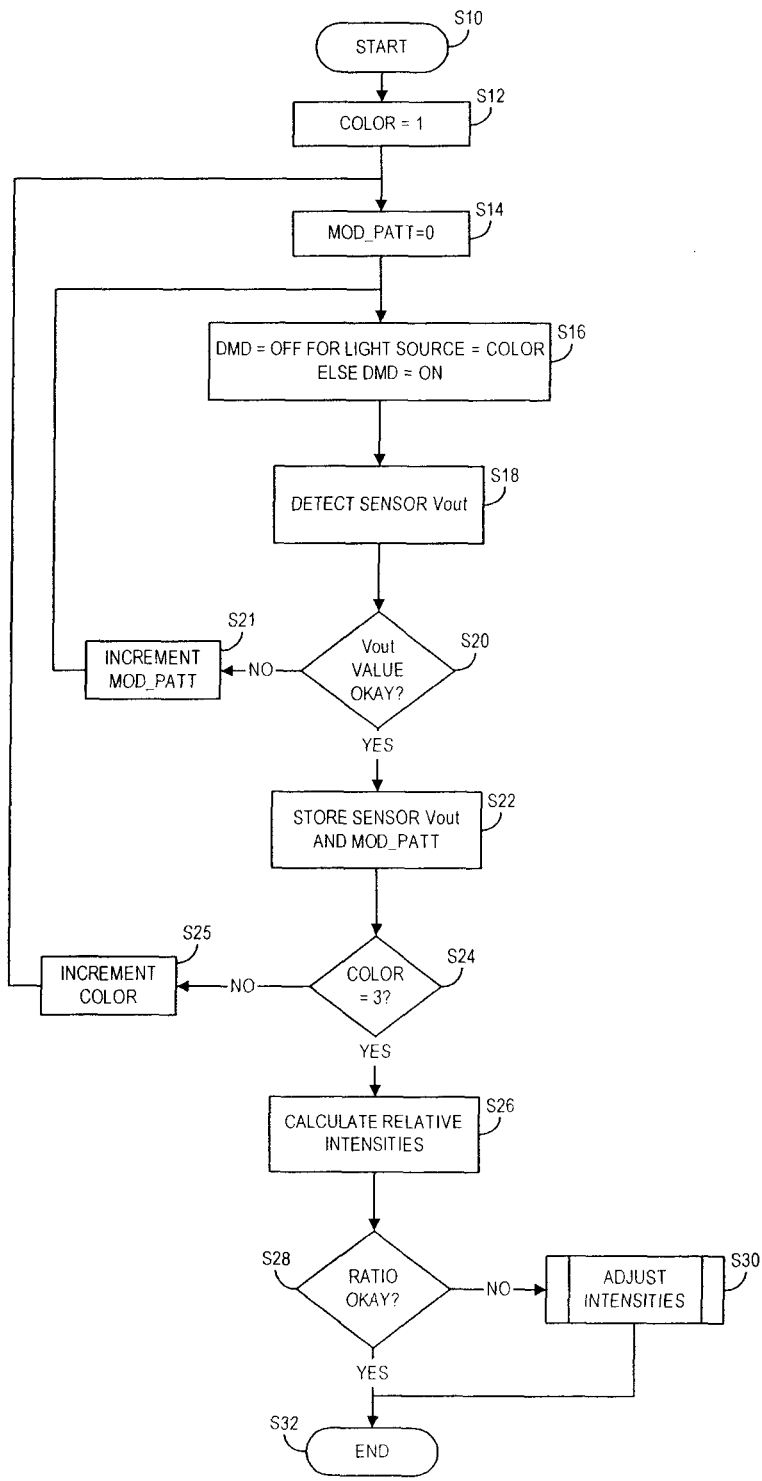
FIG. 6 shows a flowchart of a process for detecting and adjusting color balance in a display system.

FIG. 6 shows an example of a process that the processing device can perform for detecting a shift in color balance. The process shown in FIG. 6 is but one of several possible embodiments and can be modified in many ways without departing from the concepts being conveyed.

The process shown in FIG. 6 is initiated at step S10. This process can be initiated at system startup, system shutdown, every N startups or shutdowns, can be invoked by a user (e.g., in response to a user command) or system command at any time. Since an entire color time is used each time the sensor is read, the display screen will be disturbed. Therefore, in some embodiments the LED white point correction process can be run only at power down when brief flashes to the display screen are allowable. The sensor data collected can then be used at the next power-up. In such embodiments, provisions can be made to account for a change in room temperature at the next power-up. A change in room temperature can affect the accuracy of the sensor data collected at the last power down since the brightness of an LED can be affected by temperature. Appropriate correction can be made by including a temperature sensor in the system and reading temperature data any time the LED white point correction is to be applied. Any brightness errors due to temperature can be predicted by using a look-up-table in the processing device that correlates LED brightness loss to room temperature. This then allows the sensor data gathered at power down to still be used with very accurate results.

At step S12, COLOR is initialized to "I". The value of COLOR dictates which of the colors (e.g., R, G, or B) is to be directed along the optical axis OFF in the non-display direction. For example, COLOR=1 can correspond to red light, COLOR=2 can correspond to green light, and COLOR=3 can correspond to blue light. Thus, in the case of COLOR=1, red light will be directed along the optical axis OFF in the non-display direction, while green and blue light is directed along the optical axis ON in the display direction.

At step S14, MOD_PATT is initialized to "0". The value of MOD_PATT dictates the modulation pattern to be used by the DMD 106 for modulation of the off-state light. For example, MOD_PATT=0 can correspond to no modulation of the off-state light. In this case, the sensor 119 sees full-scale light for each color, which may be too bright for the sensor 119 to accurately measure. Alternatively, MOD_PATT=0 can correspond to any modulation pattern or density. To correct for this problem, the value for MOD_PATT can be changed causing the DMD 106 to modulate the light that is directed towards the sensor 119 as discussed in greater detail below.

At step S16, the light sources 102-104 are sequentially activated. The DMD 106 is controlled to direct light in the non-display direction while the light source of light sources 102-104 emitting a color corresponding to the present value of COLOR is activated. Otherwise, the DMD 106 is controlled to direct light in the display direction. For example, for COLOR=1 corresponding to R, the DMD 106 is controlled to direct light in the non-display direction while the red light source 104 is activated and the DMD 106 is controlled to direct light in the display direction while the blue and green light sources 102-103 are activated.

At step S18, the processing device 124 detects a brightness value based on a brightness signal output from the sensor 119. In a preferred embodiment, the sensor 119 outputs a voltage having a voltage level Vout that varies linearly based on the brightness of the sensed light. The voltage from the sensor 119, therefore, constitutes a brightness signal. The analog-to-digital converter 128 receives the voltage Vout from the sensor 119, and converts it to a digital brightness signal. The analog-to-digital converter 128 then forwards the digital brightness signal to the processing device 124. It will be appreciated that the analog-to-digital converter 128 is optional, for example in cases where the sensor 119 outputs a digital signal rather than an analog signal.

At step S20, a determination is made as to whether the brightness value received from the sensor 119 is acceptable. This can ensure that an output of the sensor 119 is at least within an acceptable operating range (e.g., not clipped). In some embodiments, step S20 includes checking whether the brightness value is within a specified operating range of the sensor 119. In some embodiments, depending on how the relative intensities are calculated at step S26, step S20 can include checking whether the brightness value is equal to a specified value. If the brightness value is not acceptable ("NO" at step S20), the process continues to step S21. Otherwise, if the brightness vane is acceptable ("YES" at step S20, the process continues to step S22.

At step S21, a value of MOD_PATT is incremented. In other words, the modulation pattern to be used by the DMD 106 for modulation of the off-state light is changed. If the brightness value received at step S18 is determined at step S20 to be representative of light that is too bright, then MOD_PATT can be changed to a value associated with a modulation pattern that will reduce the amount of light that the DMD 106 directs in the non-display direction. For example, MOD_PATT can be changed from MOD_PATT=0, where none of the light associated with the present value of COLOR is modulated away from the non-display direction, to an alternative value for MOD_PATT where some amount of the light associated with the present value of COLOR is modulated away from the non-display direction. It will be appreciated that the value of MOD_PATT can be any value for which a modulation pattern or calibration image can be used to achieve the desired modulation density. For example, in some embodiments the modulation patterns can include blue-noise patterns that can be controlled to vary amount; 256 grayscale levels (e.g., 0=black, 255=full-scale). The sequence of steps from step S16 to step S21 continue to be repeated until the brightness value at step S20 is determined to be a specified value or within a specified range of values.

At step S22, the brightness value determined to be the specified value or within the specified range of values at step S20, as well as the value of MOD_PATT associated with the brightness value, are stored for later use. These values of brightness and MOD_PATT are stored such that they are associated with the present value of COLOR. Specifically, the brightness and MOD_PATT values will be stored for each value of COLOR and used at step S26 for calculation of the relative intensities of the colors of light.

At step S24, a determination is made as to whether steps S16, S18, S20, and S22 have been performed for light associated with each color. Specifically, the value of COLOR is checked. If the value of COLOR does not equal "3" ("NO" at step S24), then the process continues to step S25 where the value of COLOR is incremented (e.g., from COLOR=1 to COLOR=2 or from COLOR=2 to COLOR=3) and steps S16, S18, S20, and S22 (and S21 if necessary) are repeated. Otherwise, if the value of COLOR equals "3" ("YES" at step S24), then the process continues to step S26.

At step S26, the processing device 124 calculates the relative intensities of the colors of light using the brightness values and MOD_PATT values stored at step S22. In some embodiments, the density of the modulation patterns is varied during steps S16-S20 until the sensor is driven to a prescribed brightness signal value (e.g., sane voltage level) for each color, in which case the relative intensities can be determined directly from the relative modulation densities necessary to achieve a same brightness signal value. In other embodiments, the density of the modulation patterns is varied just enough to where the sensor 119 is operating within an acceptable operating range for steps S16-S20, in which case step S26 can include deriving the relative modulation densities at which a same brightness signal value could be expected.

An example of the calculations performed in step S26 will now be described for illustration purposes. In an exemplary embodiment, the sensor 119 has a linear output (where the Vout is directly proportional to the intensity of sensed light) with a valid output range of 0.1V-0.9V, most accurate in a range of 0.4V-0.6V, and an ideal output being 0.5V. The sensor 119 output varies depending on the wavelength of color being sensed according to a color balance ratio of 1.0R/0.8G/0.6B. The modulation patterns are blue-noise patterns that vary among 256 grayscale levels (0=black, 255=full-scale).

Steps S16-S22 are performed for each of red, blue, and green light yielding the following results. For red light, a first pass (through steps S16-S21) using a blue-noise pattern at full-scale results in an output of 1.0V from the sensor 119, which is just at the edge of clipping. Thus, a second pass for red is performed using a blue-noise pattern at 25% density (allowing only 25% of the red light to be directed in the non-display direction) resulting in an output of 0.25V from the sensor 119. For green light, a first pass using a blue-noise pattern at full-scale results in a clipped output from the sensor 119. Thus, a second pass for green is performed using a blue-noise pattern at 25% density, which results in an output of 0.75V from the sensor 119. For blue light, a first pass using a blue-noise pattern at full-scale results in an output of 0.55V. Thus, a second pass for blue light is not necessary. Thus, at step S22, data for each color of light is stored as follows:

| Color | Brightness signal (Vout) | Modulation density |
|-------|--------------------------|--------------------|
| Red   | 0.25 V                   | 25%                |
| Green | 0.75 V                   | 25%                |
| Blue  | 0.55 V                   | 100%               |

Next, at step S26, the processing device 124 uses the data stored in step S22 to calculate the present (uncorrected) color balance. In this example, it is desired that the color balance for the display system 100 be maintained at two parts red, seven parts parts green, and three parts blue (0.20R/0.70G/0.30B). First, the processing device 124 calculates a modulation density for each of the colors of light at which the output of the sensor 119 could be expected to be approximately 0.5V (e.g. 0.5V±0.01V). The calculation is made for each color based on simple ratios as follows:

$$R: D_R/25\% = 0.5V/0.25V \rightarrow D_R = 50\%$$

$$G: D_G/25\% = 0.5V/0.75V \rightarrow D_G = 16.67\%$$

$$B: D_B/100\% = 0.5V/0.55V \rightarrow D_B = 91\%$$

where $D_R$, $D_G$, and $D_B$ are the respective densities at which an output of the sensor 119 could be expected to be approximately 0.5V. In other embodiments, the steps S16-S21 can be repeated until the desired output of the sensor 119 is achieved rather than performing the above calculation.

In this example, the sensor 119 output varies depending on the wavelength of color being sensed according to a color balance ratio of 1.0R/0.8G/0.6B. Thus, a calculation of the present color balance ratios must account for this sensor characteristic. The lumens ratio for the present color balance can be expressed as $L_R/L_G/L_B$ where $L_R$ is the percentage of red, $L_G$ is the percentage of green, and $L_B$ is the percentage of blue. Each component $L_\lambda$ (where $\lambda = R, G,$ or $B$) of the lumens ratio can be calculated based on the following expression:

$$L_\lambda = \left(\frac{1}{D_\lambda}\right) \times \left(\frac{1}{L_{S\lambda}}\right)$$

where $L_{S\lambda}$ is the corresponding component of the color balance ratio of the sensor 119. Accordingly, the present color-balance ratios can be calculated as follows:

$$L_R = \left(\frac{1}{0.50}\right) \times \left(\frac{1}{1.0}\right) \cong 2.00$$

$$L_G = \left(\frac{1}{0.1667}\right) \times \left(\frac{1}{0.8}\right) \cong 7.50$$

$$L_B = \left(\frac{1}{0.91}\right) \times \left(\frac{1}{0.6}\right) \cong 1.83$$

The above-calculated values are then normalized for 0.70G (recall that, in this example, the target color balance ratio is 0.20R/0.70G/0.30B) giving a present color balance ratio of 0.187R/0.700G/0.171B. Thus, in this example, the present color balance ratio requires correction.

Referring once again to FIG. 6, once the present color balance ratio has been calculated at step S26, the process continues to step S28. At step S28, a determination is made as to whether the present color balance ratio is acceptable. If not, as in the above example, the process continues to step S30 where the color balance is adjusted. Otherwise, the process ends at step S32.

At step S30, the relative intensities of the light colors R, G, and B can be adjusted according to any known method. In some embodiments, the relative intensities of light from the LEDs can be adjusted by increasing or decreasing electrical current to the LEDs. Alternatively, the LED currents can be left the same and the relative intensity of the appropriate colors can be turned down electronically via signal processing. For example, the P7, or "7 Primary" algorithm discussed above can be used to turn down the colors needed by adjusting the electronic gain on the appropriate color channels.

In the example above, where the uncorrected color balance was calculated to be a ratio of 0.187R/0.700G/0.171B, the gains required for color balance correction can be calculated as follows. First the weakest color is selected. In this example, R is weakest, G is second weakest, and B is strongest. Next, the second weakest color (G) is reduced by a certain gain amount until the ratio of the two weakest colors (R and G) is corrected. Thus, the gain for G can be calculated as follows:

$$GAIN_G = \frac{L_{NR}}{L_{TR}} = \frac{0.187}{0.200} \cong 0.935$$

where $L_{NR}$ is the red component of the normalized, uncorrected color balance ratio, and $L_{TR}$ is the red component of the target color balance ratio. The gain $GAIN_G$ is then used to calculate the gain for B that will achieve the target color balance:

$$GAIN_B = GAIN_G \times \frac{L_{TB}}{L_{NB}} = 0.935 \times \frac{0.10}{0.171} \cong 0.547$$

where $L_{NB}$ is the blue component of the normalized, uncorrected color balance ratio, and $L_{TB}$ is the blue component of the target color balance ratio. The processing device 124 can now make adjustments to the G and B color light sources according to the above-calculated gains $GAIN_G$ and $GAIN_B$, respectively. Each component $L_{C\lambda}$ (where $\lambda$=R, G, or B) of the corrected lumens ratio can be calculated as follows:

$L_{CR}$=0.187

$L_{CG}$=$GAIN_G \times L_{NR}$=0.935×0.700≈0.655

$L_{CB}$=$GAIN_B \times L_{NB}$=0.547×0.171≈0.094

The above-calculated values are then normalized once again for 0.70G (recall that, in this example, the target color balance ratio is 0.20R/0.70G/0.30B) giving a corrected color balance ratio of 0.20R/0.70G/0.10B. Thus, the color balance ratio can been corrected to the desired target ratio by adjusting the outputs of the green and blue light sources 102 and 103 according to the above-calculated gain values $GAIN_G$ and $GAIN_B$, respectively.

Figure 7:
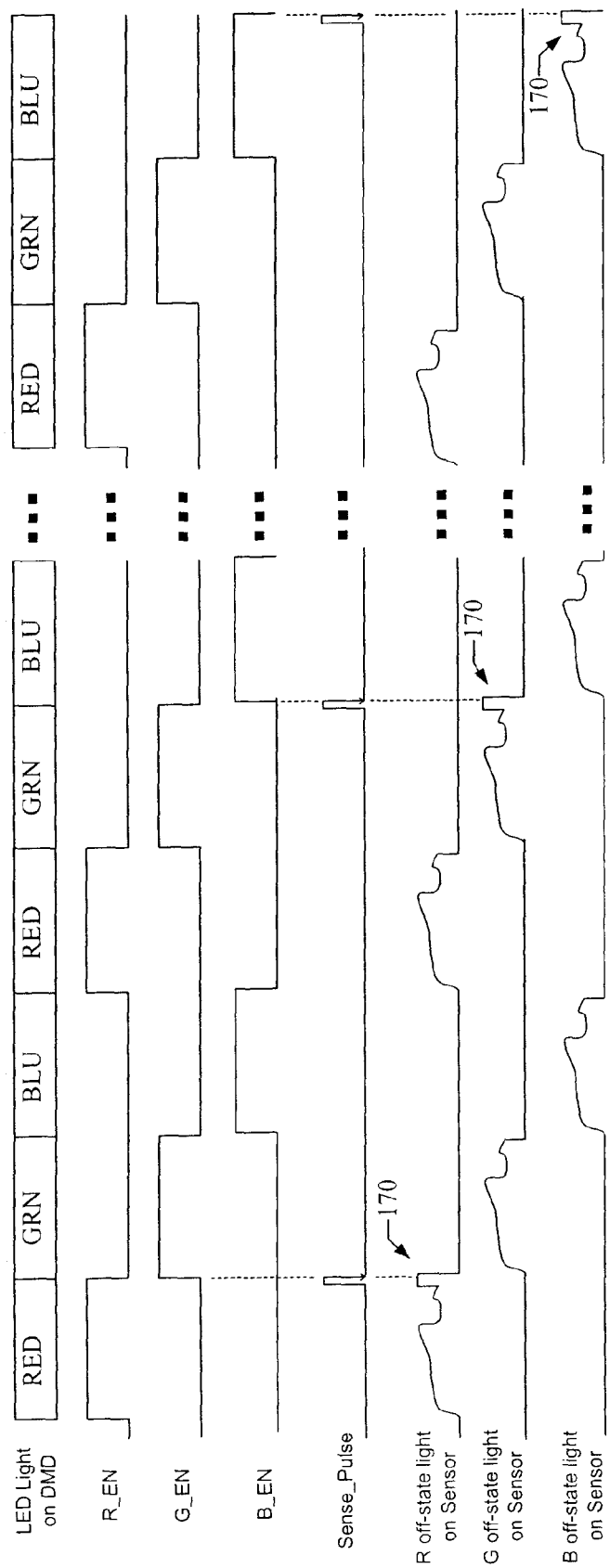
FIG. 7 shows a timing diagram for an alternative timing scheme for the process of detecting and adjusting color balance.

FIG. 7 shows a timing diagram illustrating a variant of the timing to apply the light to the sensor 119. As shown in the timing diagram, LEDs of red, green, and blue are sequentially turned on for a certain color time and then turned off according to respective signals R_EN, G_EN, and B_EN. Instead of directing the light from these LEDs to the sensor 119 throughout a complete color time, the light can be directed just briefly to it, for example at the end of a color time as shown by the sensing interval (square portion) 170 of the off-state color pulses. In this case, the sensing interval 170 can be relatively short compared to the color time, for example in a range of 10 us to 20 us, for example 20 us. The advantage of this is that the displayed image has almost no alteration. The sensing interval 170 can be a dedicated interval that always exists even if the LED calibration process is not being performed. Thus, the LED white point correction can be run real-time, for example over a span of 10 seconds. This is desirable because any temperature drifts of the system, which might impact LED brightness, can be corrected, and no look-up tables are needed to correct for brightness drifts with temperature.

Blue-noise, or other modulation patterns, can still be used during the sensing interval 170. If a 100% density pattern is used, there is then no impact to the displayed image. If <100% patterns are used, this will mean that some light is directed to the display screen during the sensing interval 170, which will slightly affect the displayed image. However, this is still much less of a disturbance to the displayed image than allocating an entire color time to collect sensor data.

Figure 8:
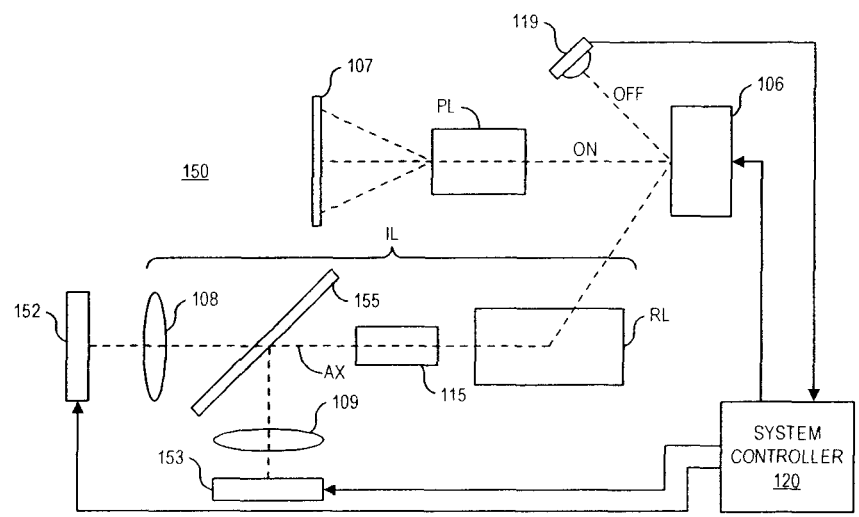
FIG. 8 shows an alternative embodiment of an SLM display system.

It should be noted that the above-described system controller 120 and method of detecting and correcting a shift in color balance can be used in conjunction with display systems other than display system 100. For example, FIG. 8 shows an optical construction for an alternative spatial light modulation (SLM) display system 150. The display system 150 includes a first light source 152 and a second light source 153. The display system 150 also includes, along an optical axis AX, an illumination optical system IL, a DMD 106, and a projection optical system PL for receiving light directed in a display direction (along the optical axis ON) and projecting the light onto a projection surface 107 for display. The display system 150 also includes a sensor 119 for sensing light directed in an non-display direction (along the optical axis OFF) by the DMD 106. The sensor 119 outputs brightness signals to the system controller 120, and the light sources 152, 153 and the DMD 106 operate according to instructions received from the system controller 120, as discussed above.

Differences between the alternative display device 150 and the display device 100 include a difference in the number of light sources and a variation in the optics used for the relay lens unit RL. Specifically, the alternative display device 150 includes a first light source 152 for emitting red or blue light (e.g., an array of light elements including red and blue light-emitting elements such as an R/B LED package) and a second light source 153 that can be controlled to emit green light. As a result, the filtering characteristics of the filter element 155 allows for passing light in the red and blue color ranges, and reflecting light in the green color range. Also, in the alternative display device 150 the relay lens unit RL includes optical elements for changing a direction of the optical axis AX, for example through the use of prism and/or mirror elements according to known techniques. Thus, it will be appreciated that the system controller 120 used in conjunction with the alternative display device 150 is adapted to send control signals to two light sources rather than three.

Still further embodiments can include display systems that utilize color-light emitting light sources, such as LEDs, and multiple spatial light modulators. For example, U.S. Pat. No. 6,587,159 to Dewald, the contents of which are hereby incorporated by reference, discloses a projection system that includes three DMDs, where each DMD can be used for modulating a respective primary color. In some embodiments, such a three-DMD arrangement can be used in combination with color-light emitting light sources, for example red, green, and blue LEDs. In multiple-spatial-light-modulator embodiments, one or more sensors can be used for detecting and adjusting color balance. For example, three sensors can be used, one for each color of light. As another example, one sensor can be positioned such that it can receive light from multiple spatial light modulators, for example placed in a dump light path of a prism that three DMDs are mounted to. In some embodiments, light can be applied to each DMD all the time (DC operation of LEDs) during normal operation, for example such that red light is constantly applied to a first DMD, blue light to a second DMD, and green light to a third DMD. In this case, the sensor would sense all three colors. So, in this case the color-balance detection process can include cycling the LEDs off two at a time so that the sensor sees just one color at a time. Another option is to use a sensor in combination with R, G, and B miniature dichroic filters, such that separate R. G, and B sensors are essentially combined in one package.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A method of controlling color balance in a display system, comprising:
   (a) controlling a spatial light modulator with a modulation pattern for an OFF-state light to direct light from a first color light source in a non-display direction onto a light sensor;
   (b) generating a brightness signal output from the sensor indicative of the intensity of the light directed onto the sensor from the first color light source;
   (c) determining whether an intensity level of the brightness signal output is within a specified operating range;
   (d) when the intensity level of the brightness signal output is determined to be outside the specified range, changing the modulation pattern to increase or decrease a density of the modulation pattern to control the intensity of the light directed from the first color light source onto the sensor to bring the intensity level of the brightness signal output into the specified operating range, and repeating (a) through (c) until the intensity level of the brightness signal output is determined to be within the specified operating range;
   (e) when the intensity level of the brightness signal output is determined to be within the specified range, storing values representative of the modulation pattern and of the intensity level of the brightness signal output;
   (f) repeating (a) through (e) for each of light directed from a second color light source and light directed from a third color light source; and
   (g) calculating and adjusting relative intensities of light from the first, second and third color light sources to set a prescribed white point or color balance based on the values stored in (e) and controlling the spatial light modulator to respectively direct light from the first, second and third color light sources in a display direction onto a display surface to form an image based on the prescribed white point or color balance.

2. The method of claim 1, wherein the spatial light modulator is a DMD including an array of independently controllable mirror elements which can be set to ON or OFF states to modulate the light, the modulation pattern being determined by the mirror elements set to the OFF state.

3. The method of claim 2, wherein changing the modulation pattern comprises adjusting the density of a blue-noise pattern.

4. The method of claim 3, wherein the first, second and third color light sources are LED light sources.

5. The method of claim 4, wherein the first, second and third color light sources are red, green and blue light sources.

6. The method of claim 1, wherein changing the modulation pattern comprises adjusting the density of a blue-noise pattern.

7. The method of claim 1, wherein the first, second and third color light sources are LED light sources.

8. The method of claim 1, wherein the first, second and third color light sources are red, green and blue light sources.

9. A display system, comprising:
   first, second and third different color light sources;
   a spatial light modulator;
   an illumination optical system comprising a plurality of optical elements directing light from the respective first, second and third light sources onto the spatial light modulator for modulation;
   a projection optical system including optical elements projecting light directed in a display direction by the spatial light modulator onto a projection surface to form an image;
   a light sensor sensing light modulated with a modulation pattern and directed in a non-display direction by the spatial light modulator, and generating a brightness signal output indicative of the intensity of the sensed light; and
   a system controller configured for operating in a color balance mode, including for light directed from each of the first, second and third light sources, the system controller performing:
      (a) setting the modulation pattern of the spatial light modulator for light directed from a selected light source of the first, second and third light sources;

(b) determining whether an intensity level of the brightness signal output for the light from the selected light source is within a specified operating range;

(c) when the intensity level of the brightness signal output for the selected light source is determined to be operating outside the specified range, changing the modulation pattern to increase or decrease a density of the modulation pattern to control the intensity of the light directed from the selected light source onto the sensor until the intensity level of the brightness signal output for the selected light source is determined to be operating within the specified operating range;

(d) when the intensity level of the brightness signal output for the selected light source is determined to be operating within the specified range, storing values representative of the modulation pattern and of the intensity level of the brightness signal output for the selected light source;

(e) repeating (a) through (d) for each of light directed from a second color light source and light directed from a third color light source; and (f) calculating and adjusting relative intensities of light from the first, second and third color light sources to set a prescribed white point or color balance based on the values stored in (d); and the system controller further configured for operating in a display mode, including:

receiving image data from a video source;

providing output control signals controlling the intensities of light from the first, second and third light sources; and controlling the spatial light modulator to respectively direct light from the first, second and third color light sources in a display direction onto a display surface to form the image according to the received image data and the prescribed white point or color balance.

10. The system of claim 9, wherein the spatial light modulator is a DMD including an array of independently controllable mirror elements which can be set to ON or OFF states to modulate the light, the modulation patterns being determined by the mirror elements set to the OFF state.

11. The system of claim 10, wherein the system controller is configured to operate in the color balance mode including changing the modulation pattern by adjusting the density of a blue-noise pattern.

12. The system of claim 11, wherein the first, second and third color light sources are LED light sources.

13. The system of claim 12, wherein the first, second and third color light sources are red, green and blue light sources.

14. The system of claim 9, wherein the system controller is configured to operate in the color balance mode including changing the modulation pattern by adjusting the density of a blue-noise pattern.

15. The system of claim 9, wherein the first, second and third color light sources are LED light sources.

16. The system of claim 9, wherein the first, second and third color light sources are red, green and blue light sources.

* * * * *